United States Patent

Law

[15] 3,640,561
[45] Feb. 8, 1972

[54] CHOPSTICK DEVICE

[72] Inventor: Patrick Raymond Law, 114-116 Macdonnell Road, Apt. 502, Victoria, Hong Kong

[22] Filed: Dec. 10, 1969

[21] Appl. No.: 883,895

[52] U.S. Cl. .......................................294/16, 81/43, 294/99
[51] Int. Cl. ............................................................B65g 7/00
[58] Field of Search ....................294/8.5, 16, 99, 33; 81/43

[56] References Cited

UNITED STATES PATENTS 3,265,068   8/1966   Holohan ..............................294/99 X
3,501,191   3/1970   Darr.....................................294/99 X Primary Examiner—Richard E. Aegerter
Assistant Examiner—Douglas D. Watts
Attorney—Ralph E. Bucknam, Jesse D. Reingold and Robert R. Strack

[57] ABSTRACT

A device for picking up pieces of food for transfer to the mouth consists of a one-piece molding of resilient plastic material including a base and a pair of elongated members connected to the base and extending therefrom at an angle to one another such that their free ends are normally in opposed spaced relation, whereby said members may be flexed by finger pressure to move the free ends towards one another to grip and pick up pieces of food.

1 Claims, 1 Drawing Figure

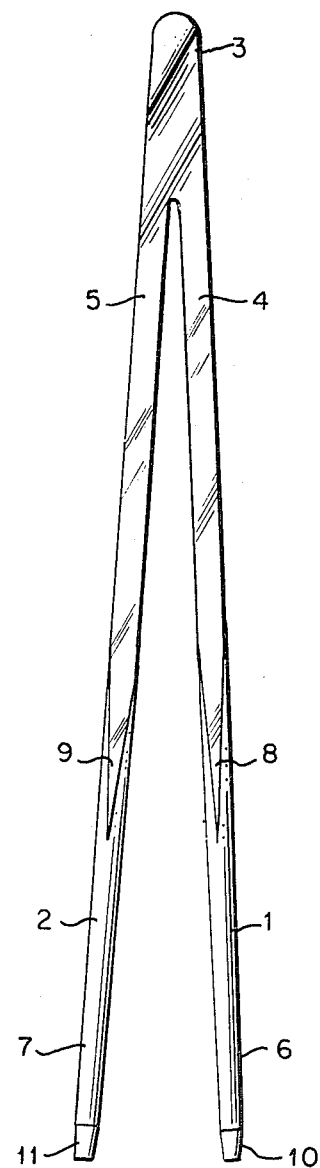

CHOPSTICK DEVICE

This invention relates to a device for picking up pieces of food and transferring to the mouth in the manner of chopsticks.

As is well known, conventional chopsticks comprise two separate sticks which are held in one hand and manipulated to move the free ends to grasp and pick up pieces of food. The manipulation of the sticks by the finger and thumb has to ensure that the free ends of the sticks are moved in alignment for gripping the food and at the same time the necessary pressure has to be applied to pick up the pieces of food. This necessary manipulation and control is not easy to achieve.

It is the object of the present invention to provide a device which is used for picking up pieces of food for transfer to the mouth and which simulates the conventional chopsticks.

The present invention provides a device for picking up pieces of food for transfer to the mouth comprising a one-piece molding of resilient synthetic plastics including a base and a pair of elongated members connected to the base and extending therefrom at an angle to one another such that their free ends are normally in opposed spaced relation, each said member tapering towards its free end and being capable of being flexed relatively to the base by finger pressure to move the free ends towards one another to grip and pick up pieces of food, the said members being adapted to revert to the opposed spaced relation when the pressure is released.

To enable the invention to be fully understood, it will now be described, with reference to the accompanying drawing which is a side view of one embodiment of the invention.

As shown in the drawing, the device comprises a one-piece molding of resilient synthetic plastics including a pair of elongated members 1, 2, integrally connected to a base 3. The members 1, 2, extend at an angle to one another such that their free ends are normally in opposed spaced relation. The nature of the material is such that the members are readily moved towards one another by finger pressure and when the pressure is released, the members will move apart into the position illustrated.

The members 1, 2 are tapered towards their free ends and are of substantially circular cross section at the free ends.

In use, the device is held in one hand with the first finger and thumb resting against one of each of the members 1, 2. Relatively light pressure will cause the members 1, 2 to move towards one another so that a piece of food can be grasped and picked up between the free ends. Immediately the pressure of the finger and thumb is released, the members will spring apart.

As the members 1, 2 are integral with the base 3, they will be constrained to move in alignment when pressure is applied.

The upper sections 4 and 5 of the two members 1 and 2 respectively have a substantially square cross section while the lower sections 6 and 7 respectively have a substantially circular cross section, the transition from square to circular cross section occurring at 8 and 9 respectively. The free end portions 10 and 11 of the members 1 and 2 respectively are circular in cross section and gradually decrease in diameter as the free ends are approached.

Although a specific embodiment of the invention has been shown and described, it will be apparent that many modifications, changes and alterations are possible without departing from the spirit and scope of the invention.

What I claim is:

1. A device for picking up pieces of food for transfer to the mouth comprising a one-piece molding of resilient synthetic plastics including a base and a pair of elongated members integrally connected to the base and extending therefrom at an angle to one another such that their free ends are normally in opposed spaced relation, each of said members having a first and a second section, said first section being integrally joined to said base and having a rectangular cross section, said second section being integrally joined to said first section and having a circular cross section, said second section having a tapered free end portion, each of said members being capable of being flexed relatively to the base by finger pressure to move the tapered free ends towards one another to grip and pick up pieces of food, the said members being adapted to revert to the opposed spaced relation when the pressure is released.

* * * * *